United States Patent Office 3,113,994
Patented Dec. 10, 1963

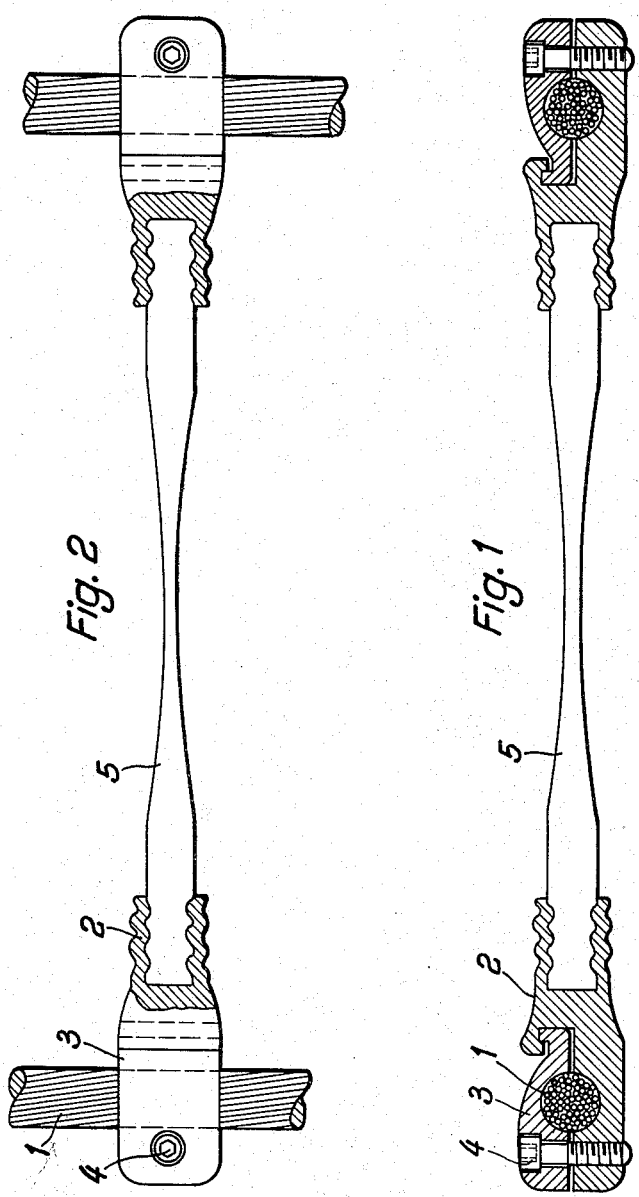

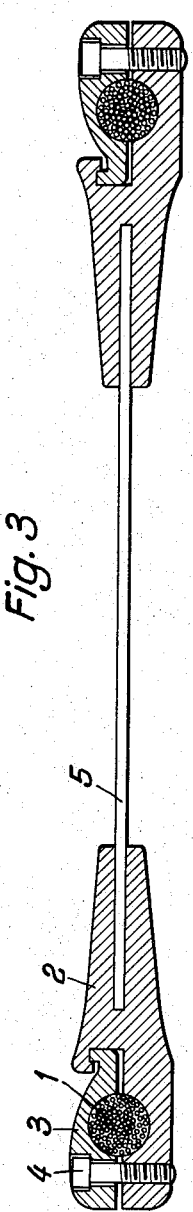
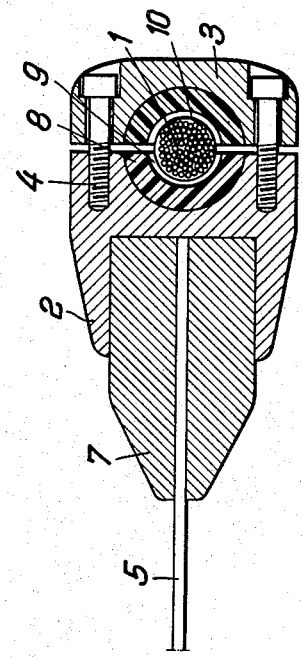
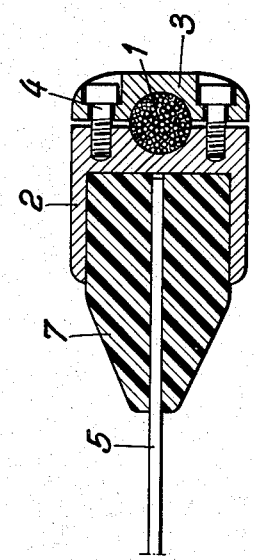

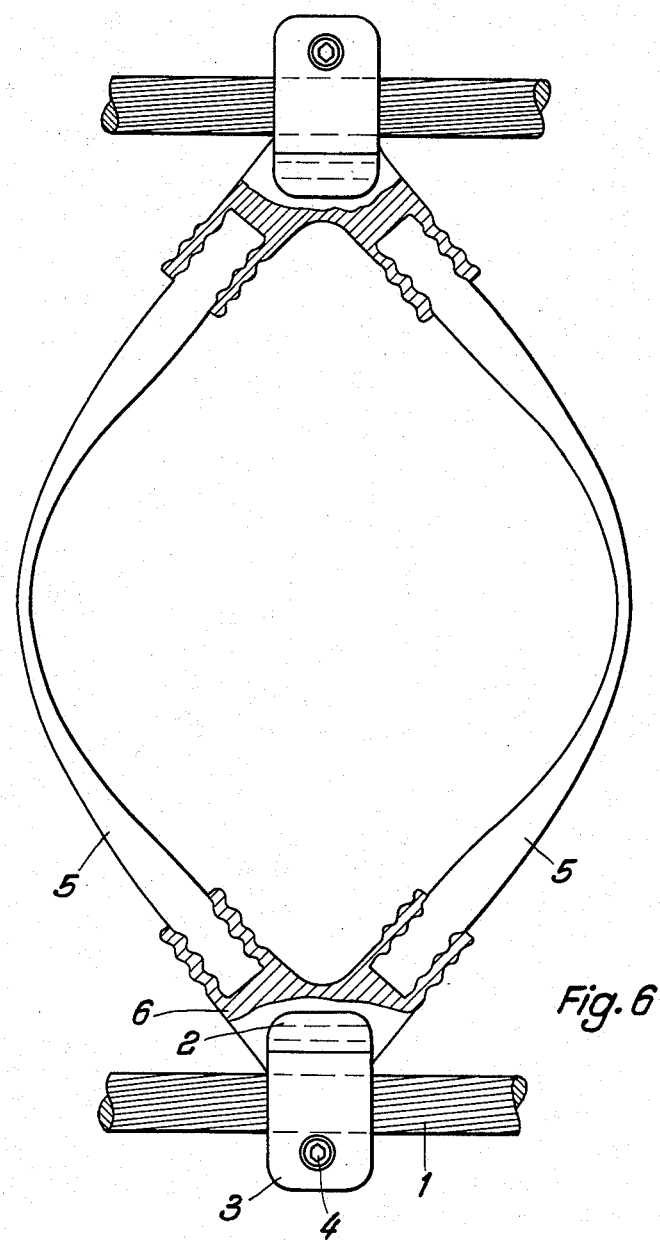

3,113,994
FIELD SPACER FOR ELECTRIC BUNCH CONDUCTORS
Siegfried Hammel, Weinheim an der Bergstrasse, and Karlheinz Herzig, Mannheim, Germany, assignors to Brown, Boveri & Cie., Aktiengesellschaft, Mannheim-Kafertal, and Beteiligungs- und Patentverwaltungsgesellschaft mit beschrankter Haftung, Essen, Germany, both German corporations
Filed July 21, 1960, Ser. No. 44,434
9 Claims. (Cl. 174—40)

Our invention relates to overhead lines for electric power distribution and, more particularly, to field spacers for bunched power transmission lines.

It is known that the surge impedance load of overhead lines can be increased up to about 50% by dividing each individual phase conductor into several component conductors having substantially the same sum cross section. It is also known that such subdivision considerably increases the corona resistance of the line. The individual conductor cables of such a bunched line must be kept a given distance from each other with the aid of field spacers in order to actually secure the desired improved transmission quality and corona resistance.

In order to cope with all such stresses, it has become known to provide field spacers with elastic intermediate members in the form of helical springs. To avoid elongation of the field spacer, the known spacer design of this type is provided with an additional steel rope located within the above-mentioned helical spring and connected to the cable clamps together with the spring. Such a spacer design is complicated and costly.

It is an object of our invention to provide field spacers for bunched overhead-line conductors that combine reliable performance under all possible types of stresses with a design of utmost simplicity, and to also achieve various other advantages mentioned hereinafter.

According to the present invention, a field spacer for electric bunch conductors, composed of intermediate members and bunch-conductor clamps, has its intermediate members shaped as elongated rods of round cross section which are elastically deflectable in all directions. The elastic rod-shaped intermediate members function to translate the occurring stresses into elastic deformation or deflection so that the field spacer, upon cessation of the stresses, resumes its original shape.

The invention will be further described with reference to the embodiments illustrated by way of example on the accompanying drawings in which:

FIG. 1 is a partly sectional front view of an individual field spacer for bunch conductors, and FIG. 2 is a likewise partly sectional top view of the same spacer.

FIG. 3 is a sectional front view of another field spacer, and FIGS. 4 and 5 illustrate in section respective modifications of such a spacer.

FIG. 6 illustrates a partly sectional top view of a further embodiment of a field spacer according to the invention comprising a pair of intermediate elastic rod members.

The spacer illustrated in FIGS. 1 and 2 is designed for use with two component bunch conductors jointly constituting a single phase conductor of a multi-phase alternating-current power line. Each of the two conductor cables 1 is rigidly enclosed by a two-part cable clamp comprising a clamp body 2, a clamp cover 3 and a clamping bolt 4. The two clamps of the spacer structure may also be given any other known design suitable for reliably securing a rigid attachment of the bunch conductor.

The clamp body 2 is rigidly joined with an elastic intermediate member which in the illustrated embodiment consists of an elongated rod of circular cross section whose diameter is a minimum in the middle of the rod length and gradually increases toward the end portions of the rod. The fastening of the two clamp bodies 2 to the rod ends is effected by pressing a neck portion of the body 2 into peripheral grooves of the rod 5, although any suitable rigid fastening method, such as screwing the rod into the clamp body is contemplated. Welding or cementing may also be employed. The elastic rod 5 preferably consists of spring steel. The rod may be given a spring constant which varies over its length, this being effected in the illustrated embodiment by correspondingly varying the rod diameter and cross section as described above. However, the variation of the spring constant along the rod axis may also be effected in other suitable ways. For example, the spring constant may be given any desired change along the rod axis. Thus, two cross sections of maximum mobility may be located more closely toward the fastening places of the cable clamps, whereas the middle of the rod member is made more rigid. A field spacer of the latter design may have two reduced cross sections on both sides, respectively, of the middle portion which, like the two ends, has full cross sections.

In the embodiment of FIG. 3, the desired variation of the modulus of elasticity or spring constant along the longitudinal axis of the cylindrical intermediate member is effected by giving the neck portion, joined by compression or otherwise with the ends of a straight cylindrical rod 5, a conical shape so that its elasticity constant corresponds to a given change along the longitudinal direction.

In the embodiment illustrated in FIG. 4, the conductor cable 1 is rigidly clamped between the clamp body 2 and a clamp cover 3 fastened by means of two clamping screws 4. The connection of the clamp body 2 with the cylindrical intermediate member 5 is effected by a cylindrical sleeve 7 which tapers conically from its seat in clamp body 2 toward the middle of member 5. The sleeve 7 consists of rubber, plastic or similar elastomer material and is intimately joined with the middle of parts 2 and 5. Such intimate junction can be made, for example, by vulcanizing, cementing or the like. In the embodiment of FIG. 4, the desired variation of the elasticity constant along the longitudinal axis of the intermediate member is due to the fact that the sleeve 7 is subjected to a portion of the deforming work caused by deflecting stresses. The sleeve 7 also acts to damp oscillations.

The embodiment according to FIG. 5 is similar to that described above with reference to FIG. 4 except that another oscillation-damping half-shell 8 is disposed between the conductor cable 1 and the clamp body 2, a second half-shell 8 being similarly disposed between cable 1 and clamp cover 3. The two half-shells 8 consist of rubber, synthetic elastomer, or similar material for improving the oscillation-damping properties of the field spacer. The two half-shells 8 are intimately joined by vulcanizing, cementing or the like with the clamp body 2 or the clamp cover 3 on the one hand and with a two-part metal shell 9 on the other hand.

It is preferable to provide for an electrically conducting connection of the cylindrical intermediate member 5 with the two conductor cables 1 attached to, and spaced from, each other by the field spacer. This can be done, for example, by connecting the intermediate member 5 at its end with the clamp body 2 and electrically connecting the clamp body 2 by means of an inserted metal foil 10 with the conductor cable 1 as is shown in FIG. 5.

The field spacer illustrated in FIG. 6 is particularly designed for vertical conductor bunches of two conductors and is well suitable to take care of forces resulting from cable oscillations in a vertical plane. Each of the two conductor cables 1 is rigidly held between a clamp body 2 and a clamp cover 3. The clamp body 2 has two divergent neck portions 6 in which the ends of two predeformed elastic intermediate members are fastened by compression or any of the above mentioned other fastening methods. Each of the two intermediate members consists of a generally cylindrical, elongated rod as described above with reference to FIGS. 1 and 2.

Field spacers according to the invention are also applicable for conductor bunches comprising more than two bunch conductors. The particular shape of the spacer is to be adapted to the number of bunch conductors to be joined with and spaced from each other. For example, the neck portion of each clamp body shown in FIG. 6 may be turned 90° about the connecting line between the two clamp bodies so that the common plane of the two neck portions extend at a right angle to the conductor-cable axis. The adjacent component conductors of the bunch, for example in a bunch of four, can then be joined with each other by a straight or curved elastically deflectable intermediate member. In this case the two neck portions of each clamp may be supplemented by two additional clamps of the same design which are located in a vertical plane passing through the connecting line of the clamp bolts 4, so that the two additional neck portions are located above and below the plane of illustration. The design of the fastening necks and of the elastic intermediate members, in field spacers of such type, may also be effected in accordance with the embodiments described above with reference to FIGS. 3 and 4.

Compared with the field spacers heretofore available, those according to the invention possess certain advantages. In the first place all loads are directly converted into elastic deformation work within the elastic intermediate member of the field spacer. This is by virtue of the fact that the intermediate member consists of a rod of elastically bendable material, for example hardened spring steel, and has circular cross section so as to be elastically bendable in all directions away from the rod axis, the rod being rigidly joined with the conductor cables by means of cable clamps.

Also of advantage is the fact that the elastic intermediate member of a field spacer according to the invention may be given a spring constant which varies along the rod axis. In this manner a given distribution of the elastic deformation work over the length of the elastic intermediate member is attained. For example, the main deformation may take place in the middle of the intermediate spring rod, in which case the cable clamps and fastening elements are used to a large extent only for the transmission of the occurring forces and thus are prevented from excessive stress or wear. Moreover due to the fact that all structural elements of the field spacer are rigidly connected with one another and with the bunch conductors, no wear can occur at any one of the structural elements, for example by motion relative to each other.

A field spacer according to the invention can be made by a simple method of manufacture, and has low weight and a relating small amount of material. By using stainless steel, the spacer can be made corrosion resistant without appreciable additional cost. Furthermore, the spring rods of circular cross section serving as intermediate members can readily and reliably be joined with the cable clamp by pressing each rod in a compression-type fastening portion of the clamp.

We claim:

1. A field spacer for bunched overhead-line conductors, comprising cable joining means including cable clamps adapted to be clamped to respective bunch conductors and clamp joining means including an intermediate member consisting of an elongated spring-rod structure of circular cross section and having its respective ends firmly joined with said clamps, said structure being elastically bendable in all directions away from the rod axis, one of said joining means being tapered from the cables toward the center of the rod structure over a major portion of the length thereof.

2. In a field spacer for bunch conductors according to claim 1, said spring-rod structure having a homogeneous cross section and having a uniform spring constant along its entire length between said clamps.

3. In a field spacer for bunch conductors according to claim 1, said structure having a homogeneous cross section and consisting of a steel rod of circular cross section and having a diameter varying along the rod length so as to preferentially bend at a predetermined location.

4. In a field spacer for bunch conductors according to claim 1, said structure comprising a spring rod having a uniform diameter along its length, and each of said clamps having a neck portion rigidly joined with one of the respective ends of said rod and tapering along a major portion thereof from the conductor-location of the clamp toward the middle of the rod, said neck portion having circular cross section and being likewise elastically bendable in all directions.

5. A field spacer for bunched overhead-line conductors comprising two clamps of which each has a base portion and a cover portion for jointly clamping a bunch conductor, two intermediate bodies of oscillation-damping material, each body having a cylindrical portion firmly joined with one of said respective base portions and having a conical portion coaxial with said cylindrical portion, and a spring-steel rod of uniformly circular cross section coaxially joining said two bodies in mutually spaced relation and having most of its length extending between said two conical portions, said rod being normally located on a straight line between the conductor-clamping locations of said two clamps and being bendingly deflectable in all directions transverse to said line.

6. In a field spacer for bunch conductors according to claim 5, comprising in each of said clamps a split sleeve of oscillation-damping material having two half-shells disposed in and joined with said base portion and said cover portion respectively, and a split shell of metal coaxially disposed in said sleeve and having two half-shells firmly joined with said respective sleeve parts.

7. In a field spacer for bunch conductors according to claim 6, said rod, said clamp base portion and cover portion, as well as said split shell being electrically connected with one another so as to be also connected with the bunch conductors when in use.

8. In a field spacer according to claim 1, each of said cable clamps comprising a clamp body having a plurality of divergent neck portions, and said spring-rod structure having a corresponding plurality of spring rods rigidly fastened in said respective neck portions.

9. In a field spacer according to claim 8, said spring rods being pre-deformed and having arcuate shape between the respective clamp neck portions at the two rod ends.

References Cited in the file of this patent

UNITED STATES PATENTS

| | | |
|---|---|---|
| 2,918,520 | Stevens | Dec. 22, 1959 |
| 2,937,225 | Kaminski et al. | May 17, 1960 |
| 2,937,226 | Kaminski et al. | May 17, 1960 |

FOREIGN PATENTS

| | | |
|---|---|---|
| 1,035,230 | Germany | July 31, 1958 |
| 724,729 | Great Britain | Feb. 23, 1955 |